Figure 1:
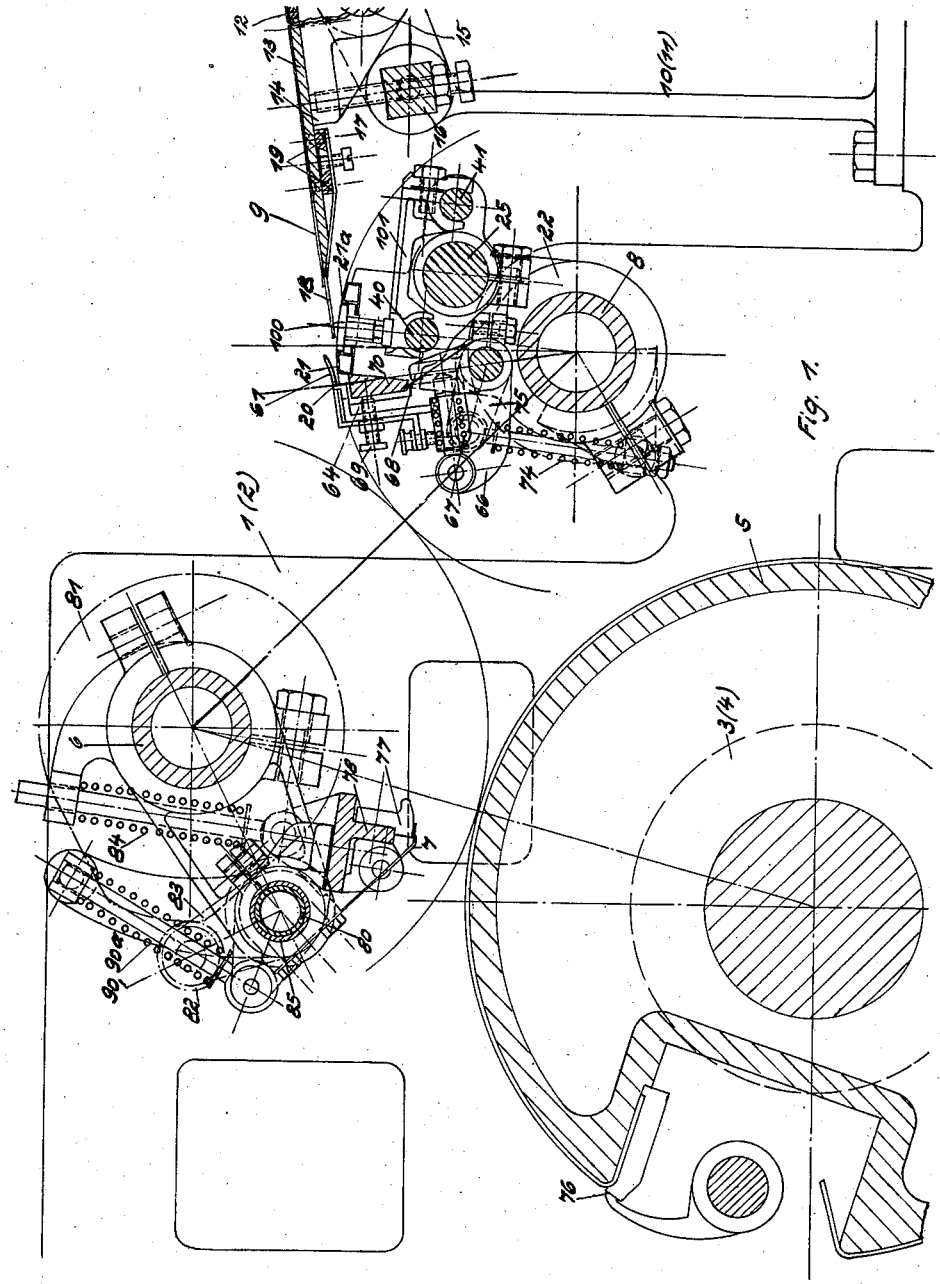

Oct. 12, 1937.  A. WORMSER  2,095,276
SHEET REGISTERING DEVICE
Filed March 31, 1931  8 Sheets-Sheet 1

Inventor:-
Arthur Wormser
by attorneys

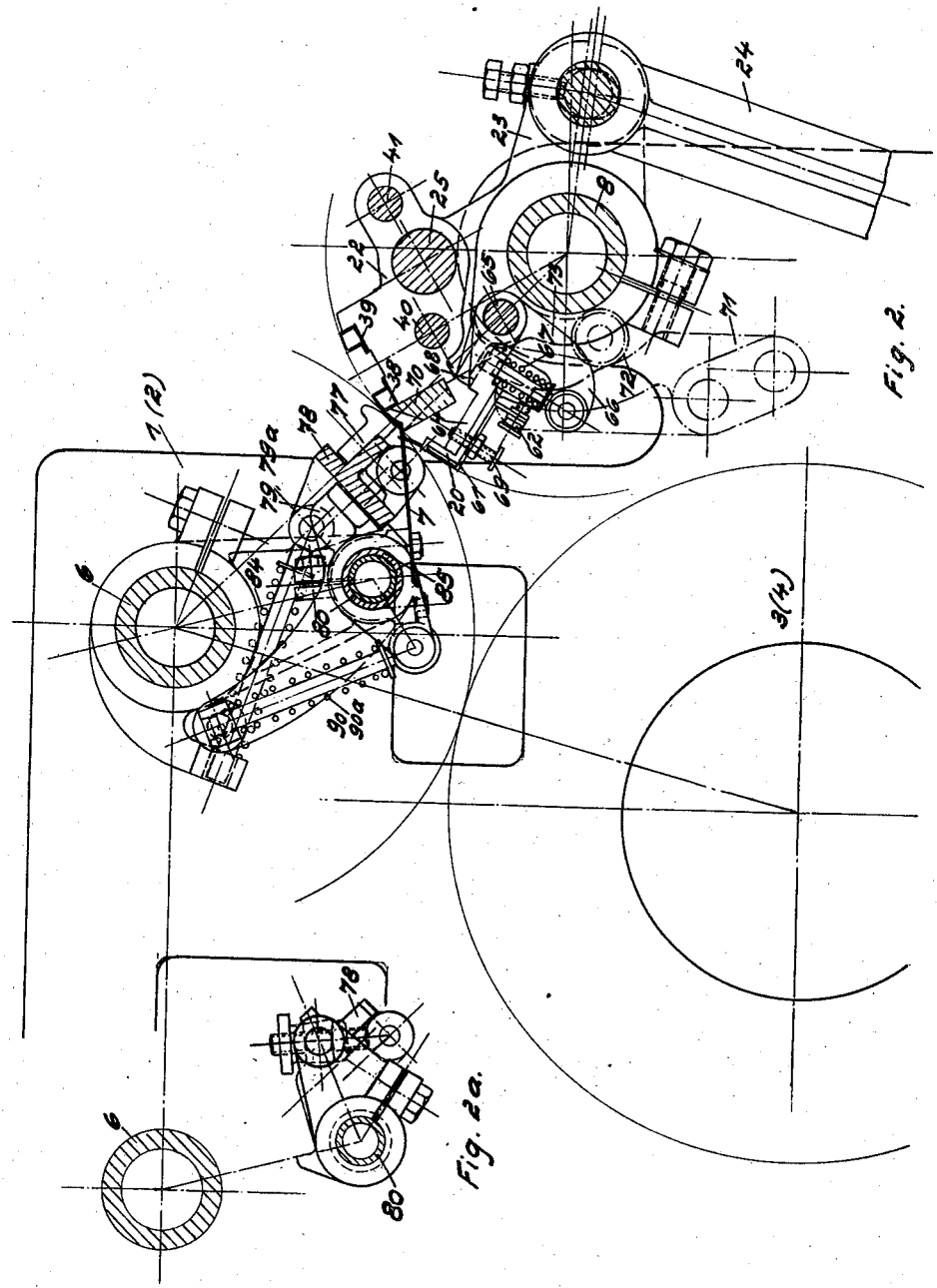

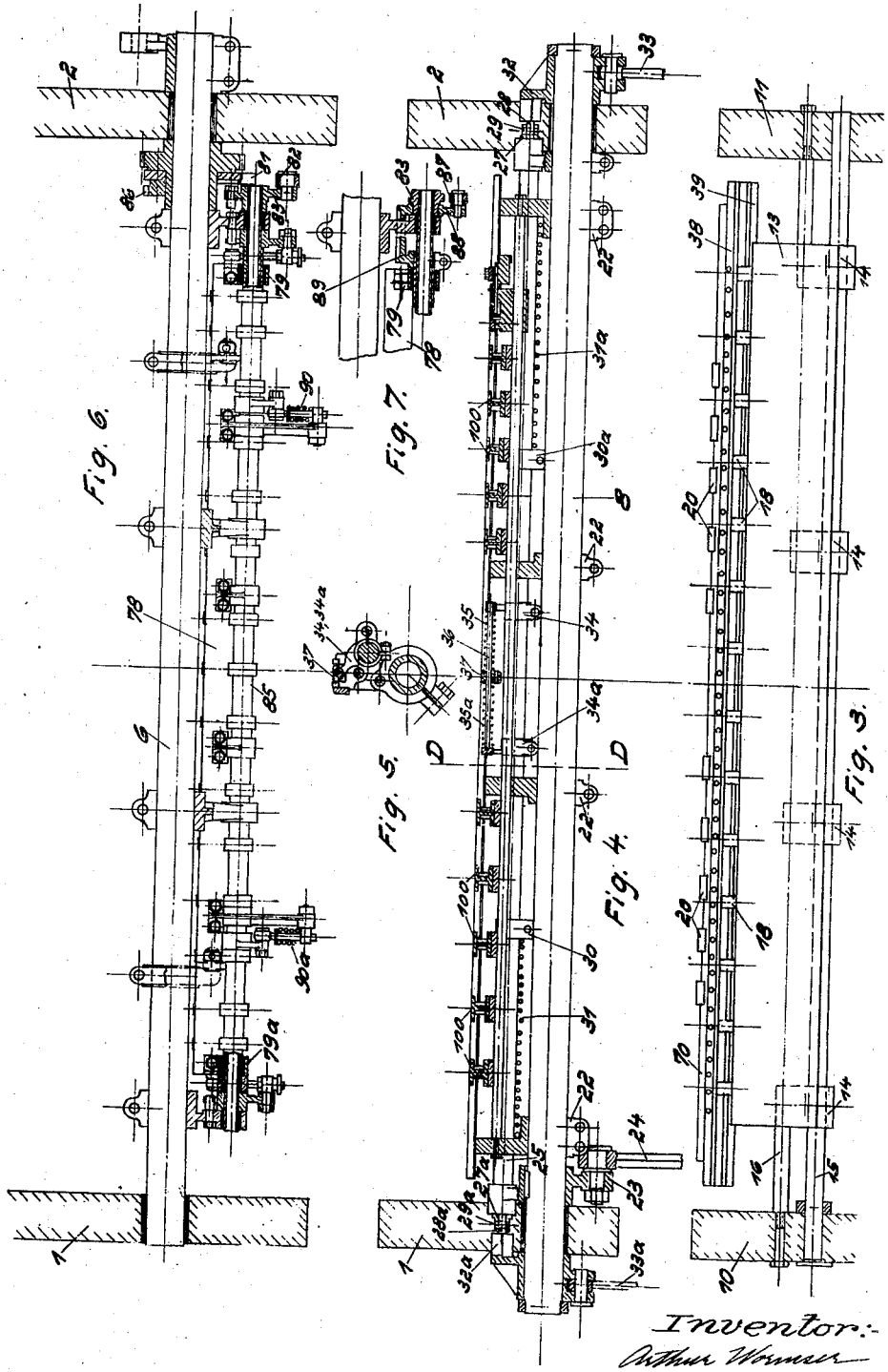

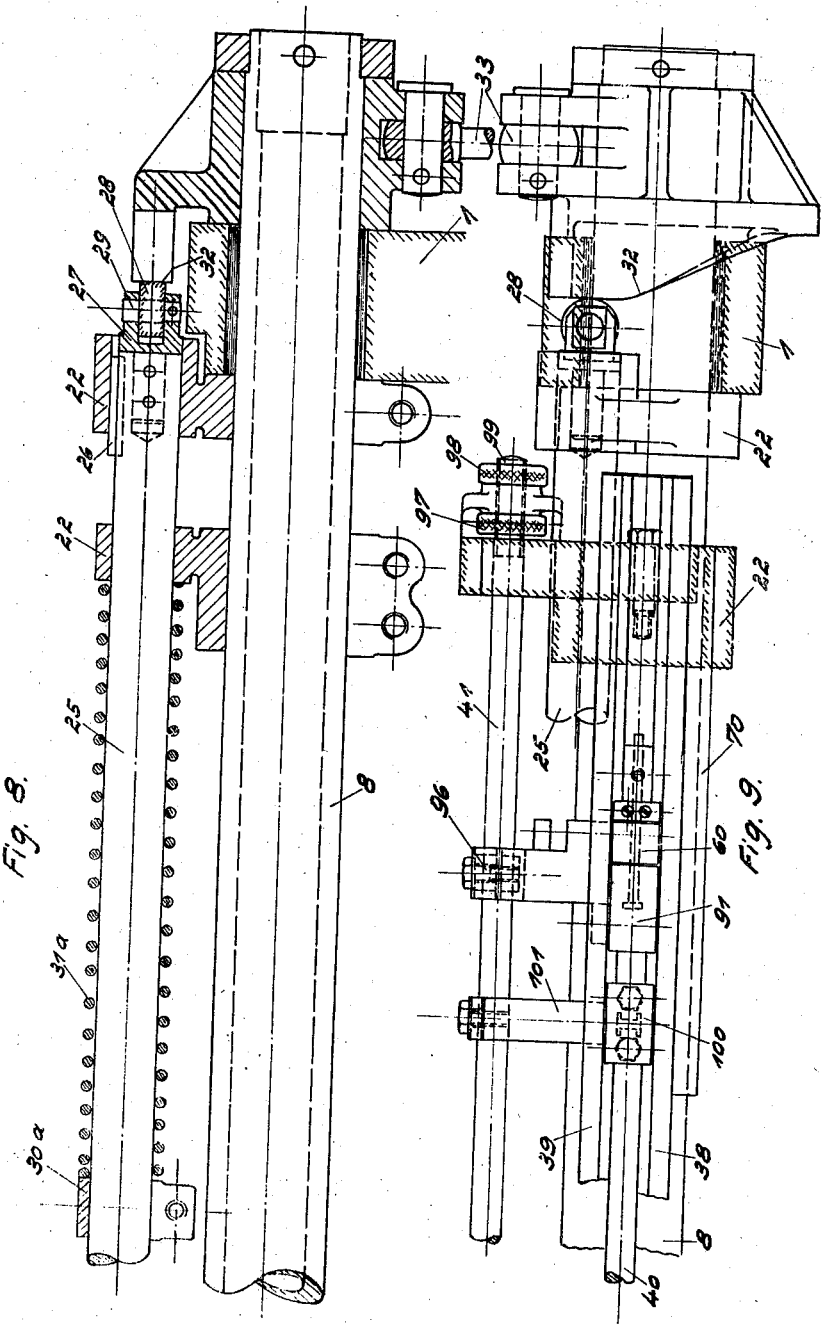

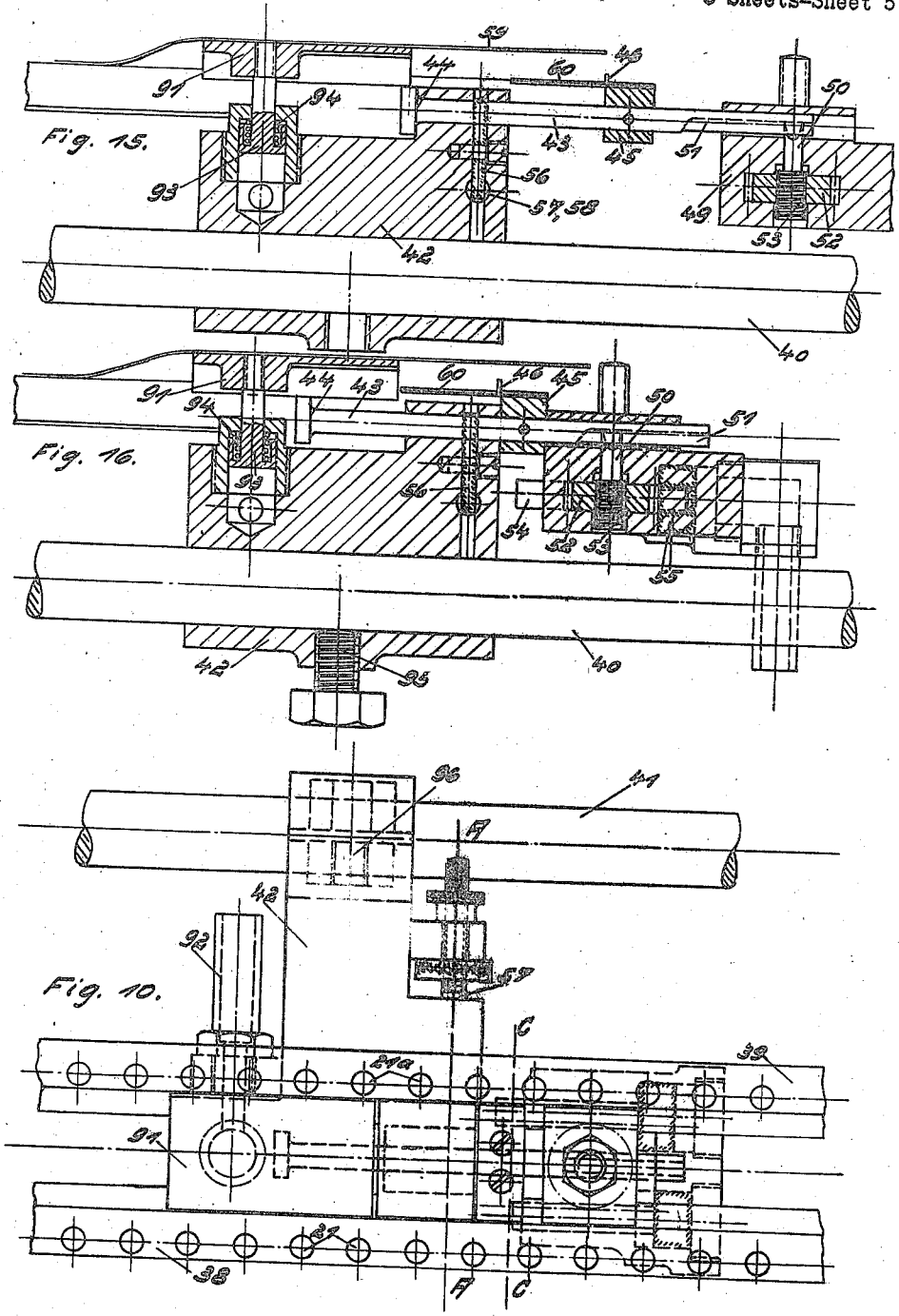

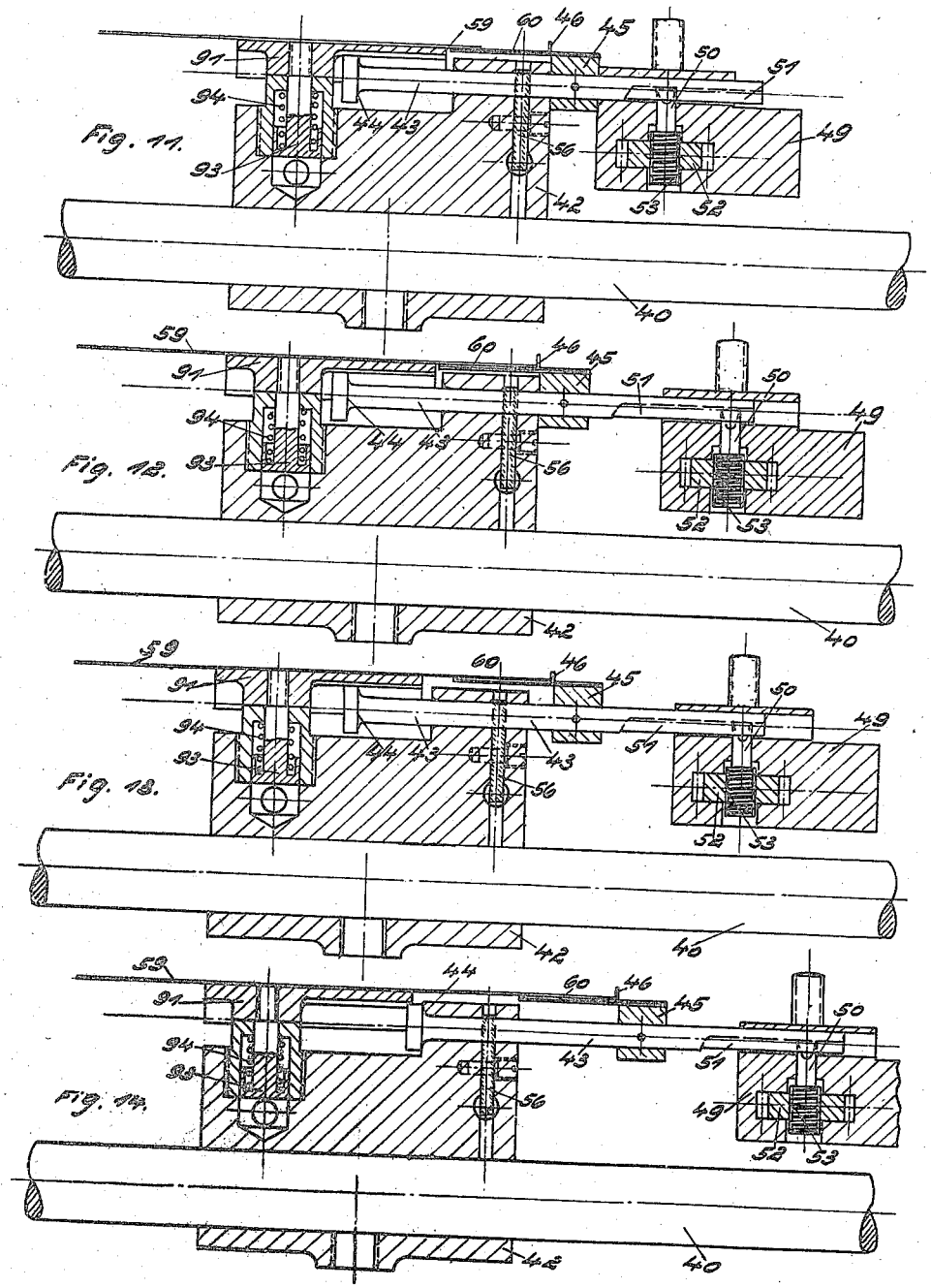

Oct. 12, 1937.  A. WORMSER  2,095,276
SHEET REGISTERING DEVICE
Filed March 31, 1931    8 Sheets-Sheet 7
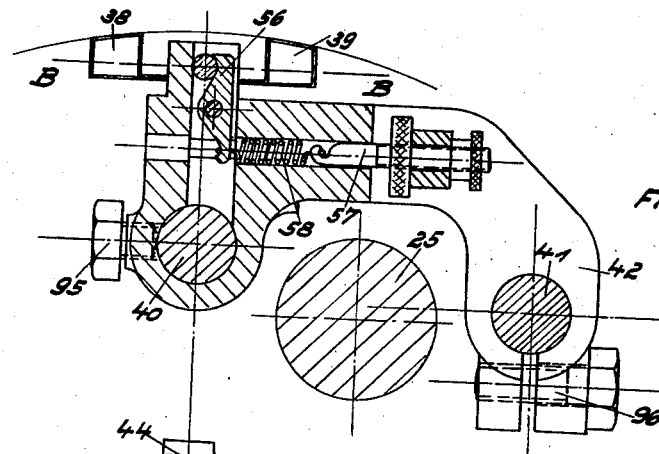
Fig. 17.
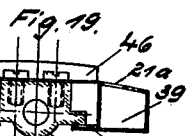
Fig. 19.
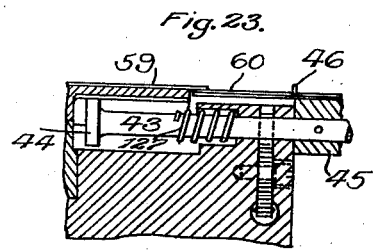
Fig. 23.
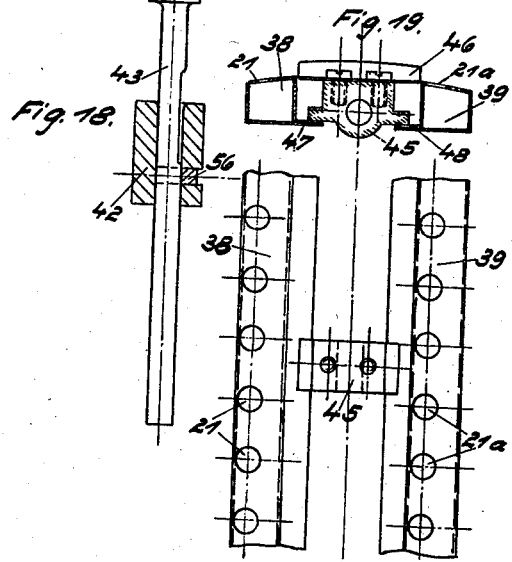
Fig. 18.
Fig. 20.
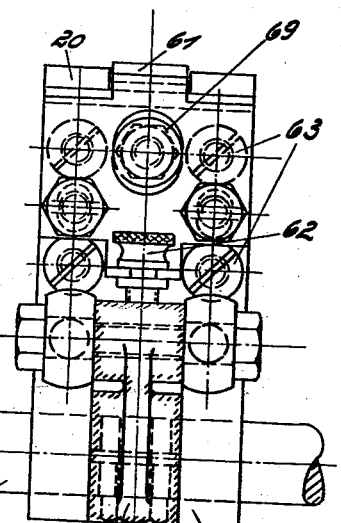
Fig. 21.
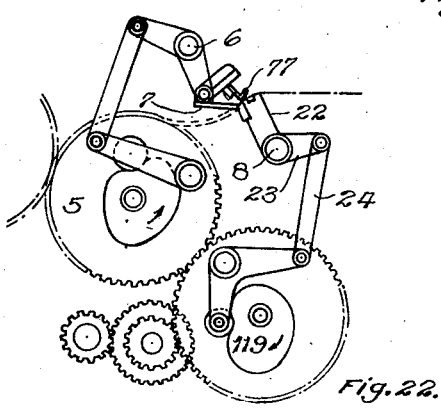
Fig. 22.
Inventor:-
Arthur Wormser
by attorneys

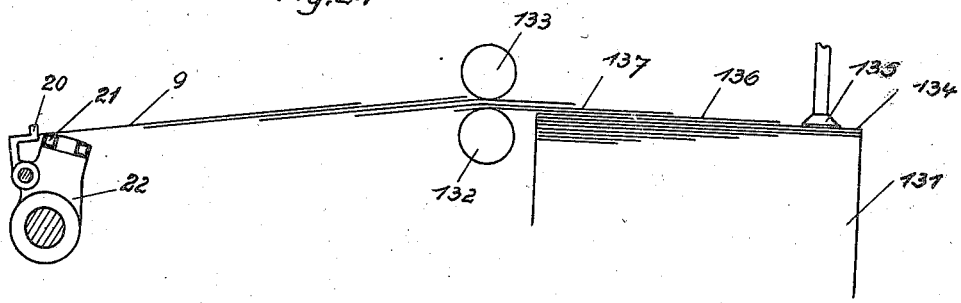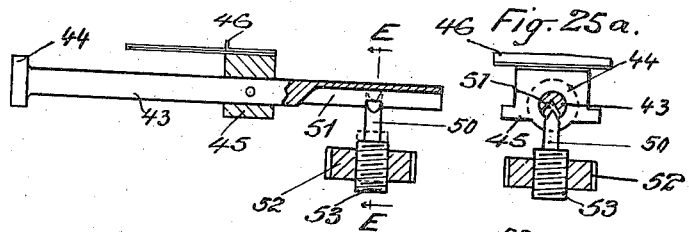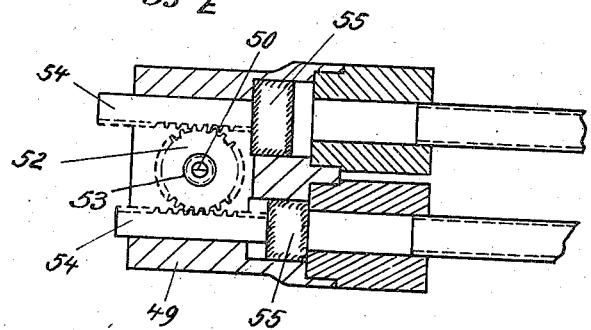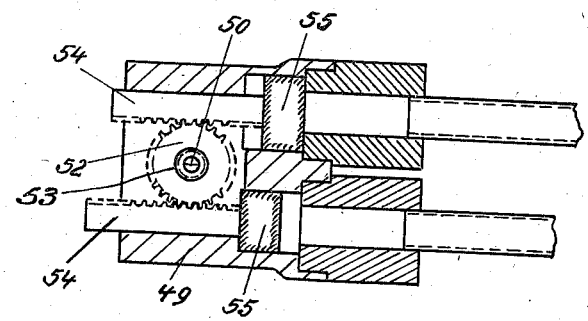

Patented Oct. 12, 1937

2,095,276

UNITED STATES PATENT OFFICE 2,095,276

SHEET REGISTERING DEVICE

Arthur Wormser, Offenbach-on-the-Main, Germany, assignor to Faber & Schleicher, A. G., Offenbach-on-the-Main, Germany, a corporation of Germany Application March 31, 1931, Serial No. 526,637
In Germany April 17, 1930

70 Claims. (Cl. 271—53)

The present invention is an improvement in feeders particularly adapted for use in association with printing presses, but adapted for use in any association where such a device is desirable.

The principal object of this invention is to provide a new registering device which will allow for a higher speed than it is hitherto obtainable, this speeding up being effected by such an arrangement and way of operation of all parts of the registering device that the idle part of the printing press or the like may be passed in a shorter time than is available for the registering.

Another object of my invention is to provide a device which is workable whilst the preceding sheet partially covers the sheet to be registered.

Another object of my invention is to provide a device which is workable whilst the sheet is being transported.

Another object of my invention is to provide a device in which the sheet after having been registered in one direction at least, is transported with a higher speed than the working speed of the press or the like.

Another object of my invention is to provide a device in which the sheet whilst being registered in one direction at least, is transported with a higher speed than the working speed of the press or the like.

Another object of my invention is to provide a device in which the sheet at once is positively held fast and the device holding the sheet is shifted by such a distance as the uninfluenced position of one edge of the sheet prescribes.

Another object of my invention is to provide a simply and effectively working device for registering the second edge of the sheet, held fast after the registering of the first edge.

Another object of my invention is to provide for means bending and tightening the sheet whilst its second edge is being registered.

Another object of my invention is to provide for a side registering device that can be disposed very closely to the front edge of the sheet.

Another object of my invention is to provide a front lay the actuating parts of which are arranged underneath the sheet to be fed.

Other objects of my invention will be apparent from the subjoined description and from a consideration of the operations and functions of the mechanism embodying my invention.

In order that my invention may be fully understood, I will first describe the same with reference to the accompanying drawings, and afterwards point out the novelty thereof more particularly in the annexed claims.

In the accompanying drawings Fig. 1 is a sectional elevation through the whole device. Fig. 2 is a sectional elevation showing another position of the whole device. Fig. 2a is a detail of the forgripper device. Fig. 3 is a plan of the feeding plate and of the device holding and shifting the sheet. Fig. 4 is a sectional elevation of the side sheet. Fig. 5 is a section of the same registering device. Fig. 5 is a section of the same through the line DD in Fig. 4. Fig. 6 is a section of the forgripper device and Fig. 7 another section of a detail of the same. Fig. 8 is a sectional elevation of the parts actuating the sheet shifting device, in the same larger scale as the following figure is. Fig. 9 is a plan of the same device as Fig. 8 containing some parts of the side registering device. Fig. 10 is a plan of the side registering device in a still larger scale. Figs. 11–16 are sectional views of the side registering device in the same scale as Fig. 10 showing the successive positions of this device. Fig. 17 is a section through the line AA indicated in Fig. 10. Fig. 18 is a section through the line BB in Fig. 17. Fig. 19 is a section through the line CC in Fig. 10. Fig. 20 is a plan of the same details as shown in Fig. 19. Fig. 21 is an elevation of the front lay. Fig. 22 represents diagrammatically, on a reduced scale, the means of driving certain of the mechanisms, and Fig. 23 represents, on an enlarged scale, a shock absorbing means for one of the elements. Fig. 24 represents diagrammatically on a small scale, a pile of sheets to be fed to the machine and the means for feeding the same, together with the front gauge and certain of the parts adjacent thereto. Fig. 25 represents a detail, partly in section, of a portion of the side registering device in the same scale as Fig. 10. Fig. 25a represents a vertical section taken in the plane of the line EE of Fig. 25. Fig. 26 represents a detail horizontal section of a portion of the mechanism for controlling the side registering device showing the parts in an unlocked position. Fig. 27 represents a similar view of the parts in their locked position.

Referring to Figs. 1 and 2 the side frames of the printing press are denoted by 1, 2 in which frames the bearings 3, 4 of a printing cylinder 5 are disposed, and the same frames may support the axle 6 of a device containing the forgrippers 7 and the axle 8 of a special registering device described further on.

The side frames 10, 11 (see also Fig. 3) support the feeding table 12. The steel feeding plate 13 is supported by arms 14 which are loose on an axle 15 supported by the said frames 10, 11. Between the frames is fixed a bar 16 in which there are screws 17 adapted to adjust the angle of the plate 13. The front edge of the sheet is not supported by the plate 13 but by tongues 18 which by means of a slideway 19 can easily be adjusted sideways. The means of feeding the sheets to the machine is shown diagrammatically in Fig. 24 without constructional details as this part of the device is not an essential feature of my invention. The pile of sheets to be fed to the machine is denoted by 131. In front of this pile two rollers 132, 133 are disposed, one of which is rotated at a predetermined speed to feed the sheets forwardly. The uppermost sheet 134 of the pile is aspirated by a suction nozzle 135 in proper time, whilst the rear end of the two preceding sheets 136, 137 are still lying on the sheet 134. After having aspirated the sheet 134, the nozzle 135 moves forwardly and inserts the front edge of the sheet 134 between the rollers 132, 133, so that it is fed forwardly with the preceding sheets overlapping it. The nozzle 135 now releases the sheet 134 and returns to its initial position. By this or any similar device, the sheets are fed up to the front lay 20 in such a state that every sheet is overlapped by the preceding sheet. When the sheet 9, which is shown in Fig. 1 as being a certain distance from the front lay 20, will have touched the front lay, as shown in Fig. 24, it is not registered sideways, as is usual, but at once it is held fast by the suction effect of a row of nozzles 21 which are supported in such a way that they easily can be shifted sideways, by levers 22 fixed on the axle 8 mentioned above. The front lays 20 may, if desired, participate in the lateral motion of the nozzles 21, although in the embodiment shown in the drawings they do not move sidewise. Conventional means are applied for connecting the nozzles 21 with a valve (not shown) for opening and closing this valve and for connecting it with the vacuum pump.

Now the axle 8 by means of the lever 23, connecting rod 24 and a cam 119 (Fig. 22), begins swinging forward, taking along the front lays 20, the nozzles 21 and the sheet 9. After a certain swing a second row of nozzles 21a gets in touch with the sheet 9, and suction at once begins there too so that the sheet is now held by two rows of nozzles.

The levers 22 are still continuing their forward swing between the positions shown in Fig. 1 and Fig. 2, whilst the registering sideways is taking place as now will be described.

In the levers 22 (Figs. 4 and 8) is supported a sliding rod 25, on the two ends of which there are keys 26 preventing it from being turned, but permitting it being shifted. Furthermore at the two ends of rod 25 there are forks 27, 27a supporting rollers 28, 28a by means of pivots 29, 29a. Depending on the adjustment of either one of two rings 30, 30a either the spring 31 presses the rod 25 to the right or another spring 31a presses it to the left. In the case shown in the drawings Fig. 4 the roller 28 may bear against a cylindric cam 32, whilst in the other case the second roller 28a on the other end of the rod 25 would bear against a similar cam 32a, arranged on the other side of the machine. This double arrangement has the purpose to register sideways either edge of the sheet, as sometimes is necessary.

The roller 28 is rolling over the surface of the cam 32 in consequence of the swing of the levers 22. But in addition to this the cam 32 is swinging in the opposite sense to make the shifting of the rod 25 quicker. This swing of the cams 32, 32a on the axle 8, on which they are turning easily, is produced by connecting rods 33, 33a and cams not shown in the drawings.

On the rod 25 are fixed two arms 34, 34a (Figs. 4 and 5) between which there are two springs 35, 35a pressing against each other on a rod 36 on which slides a little body 37 which is clamped on the lips 47, 48 projecting from the rectangular tubes 38, 39, containing the two rows of nozzles 21, 21a.

By the means described it is possible to interrupt the shifting sideways of the rows of nozzles suddenly without the big mass of the parts 25—31 and 34 being stopped at a time. The springs 31 being much stronger than the springs 35, the roller 28 is continuously bearing against the cam 32, and when the rows of nozzles are stopped, the spring 35 is compressed.

The rows of nozzles in the tubes 38, 39 are stopped in the following way (Figs. 9–14). Between the levers 22 there are fixed two rods 40, 41 on which a block 42 is fastened on a point depending on the width of the sheet to be fed (a second block with all the other parts described below is arranged on the other side of the machine for being able to register the other edge of the sheet, as mentioned above). In block 42 there is arranged a little bar 43 easily shifting sideways, this lateral movement being stopped, in one way by the head 44, in the other way by a little body 45 fixed to the bar 43 and supporting the side lay 46. The body 45 bears on the two lips 47, 48 mentioned above, thus hindering the bar 43 and the side lay 46 from being turned (see also Fig. 19). Attached to the side lay 46 is a surface 60 on which the sheet rests, the upper portion of which surface is of cylindrical form.

On the same lips 47, 48 is clamped a little body 49 (Fig. 11) in which is a hole through which the end of the bar 43 can move without friction. But if a wedge 50 is pressed into a notch 51 of the bar 43, this bar definitely is clamped in the body 49 and consequently fixed to the rows of nozzles as well. The clamping and unclamping is produced by a pinion 52 having a screw threaded engagement with a thread 53, provided on the wedge 50. The pinion 52 is turned in either way by two racks 54, alternately moved by two pistons 55 as soon as either one is pressed by air pressure, controlled by valves not shown. The diameter of the clamping piston is smaller than the diameter of the unclamping piston so that unclamping is produced in any case. The wedging of the bar 43 by the wedge 50 takes place at the moment fixed by the machine which is therefore not dependent on the position of the sheet to be registered.

In the block 42 is arranged a small lever 56 (see also Figs. 17 and 18) bearing with one end against the side of the bar 43, the pressure being adjustable by a screw 57 and a spring 58, thus enabling a very fine regulation of the friction of bar 43 in block 42.

The described arrangement is working in the following way (Figs. 11–14). When the sheet is fed to the front lays and advanced by the suction nozzles 21, 21a, the arrangement is in the position shown in Fig. 11 i. e. the roller 28 being on the top of the cam 32, the body 37 and the tubes 38, 39 on which the body 37 is clamped, are in their position farthest left. As the body 49 is also clamped on the tubes 38, 39, it presses the body 45 against the block 42, so that there is no distance between 42, 45 and 49. This position of the parts is represented in Fig. 11. In addition, the edge of the sheet 59, shown in said figure is initially disposed a certain distance from the side lay 46, which distance may vary, since the sheet 59 is not yet registered. Therefore, provision must be made so that the sheet in moving toward the front lay does not arrive so far to the right as to bear against the side lay or so far to the left as to miss the cylindrical surface 60. This condition is compensated for by the lateral adjustment of the block 42 on the bar 40 and the body 49 on the lips 47, 48.

When now the roller 28 descends on the surface of cam 32, the tubes 38, 39 move to the right, taking along the sheet and the body 49, but not the bar 43 which is held by the friction of lever 56. When this movement has proceeded sufficiently long, the edge 59 of the sheet bears against the side lays 46 as shown in Fig. 12 vibration of the side lay being damped by the friction between the lever 56 and the bar 43. From this moment the sheet takes along the side lay 46 and with it the bar 43. To facilitate this the bar 43 is partly milled out in proper shape (Fig. 18) so that the pressure and consequently the friction of lever 56 is diminished as soon as the motion of bar 43 has begun.

After the side edge of the sheet 59 has taken along the side lay and bar 43 a certain distance, as shown in Fig. 13 the valve (not shown) is caused to be actuated to permit the pressure of air to move the clamping piston 55 and racks 54, which movement of the racks rotates the pinion 52 threaded on the wedge 50 and the wedge 50 is pressed upwards, as shown in Fig. 13 so that the bar 43 is now clamped to the tubes 38, 39. In any event the moment of clamping must not be set too early because the sheet 59 may be quite a distance from the side lay 46 and must be brought to the side lay and slightly move the same before the wedge 50 clamps the bar 43. The moment of clamping may be controlled by structural design for the reason that the body 49 is clamped to the suction tubes 38, 39 which shift the aspirated sheet sideways, in connection with which the side lay 46 and also the bar 43 are carried along by the aspirated sheet. Therefore, between the bar 43 and the wedge 50, there is no relative motion so that the clamping fast can take place within given limits at any desired moment which is independent of the chance position of the sheet to be registered.

The lateral motion of the tubes 38, 39 still continues until the head 44 bears against the block 42 (Fig. 14). This happens earlier or later depending on the position, where the bar 43 has been clamped in the body 49. This position of the bar 43 within the body 49 is variable because the initial distance of the side edge of the sheet from the side lay is also variable. If, for instance, the unregistered sheet is positioned far to the left or a great distance from the side lay, as shown in Fig. 11, then the sheet will have a greater distance to travel before it reaches the side lay and it will urge the side lay only a short distance before the wedge 50 clamps the bar 43, as shown in Fig. 13. If, however, the unregistered sheet is positioned near the side lay, then the movement of the sheet to the side lay will be relatively smaller before the side lay and bar are urged to the position to be clamped. In the moment of clamping, the bar 43 will be more or less within the body 49 and the suction tubes 38, 39 carrying the body 49 will travel, in one instance, a shorter distance and, in another instance, a longer distance before the head 44 bears against the block 42. When the above mentioned operations are completed, the final position is reached, as shown in Fig. 14. Thus, it will be seen that the side edge of the sheet 59 bears against the side lay 46, the lay having been first urged by the sheet and, after the clamping of the bar, the sheet as well as the bar 43 with the side lay attached to it, having been moved further by the suction tubes 38, 39. In any case the side lay 46 will be brought to a definite position by reason of its being clamped to the bar 43 and the head 44 on the bar being brought to bear against the stationary block 42. Thus, an accurate lateral registering of the sheet will be accomplished. The full stroke of the rod 25 must be a little more than double the biggest distance one allows the edge 59 to have from the side lay 46 at the beginning of the registering. The difference in the travel of the suction tubes 38, 39 and the sheet 59 taken up to the moment when the head 44 bears against the block 42, is compensated for by the compression of the spring 35. When the sheet is fully registered the levers 22 will have reached such a position that the sheet can be taken over by the forgrippers 7. These meanwhile have swung in a position shown in Fig. 2 and at a time the levers 22 have reached a position shown in the same figure.

In this Figure 2 the front lays 20 are shown swung forward. This is necessary for two reasons. The sheet will keep its speed after having been gripped by the forgrippers 7 whilst the levers 22 in the same time will be slowed down; thus the sheet would be torn, if the front lays were not moveable; and secondly, to insure a good front registering, there must be little horns 61 pressing the front edge of the sheet downwards. These horns must be brought out of the way to enable the sheet to be lifted from the nozzles.

The position of these horns 61 is adjustable proportional to the thickness of the sheet by means of screws 62 and this adjusting having been effected, the horns are clamped on to the front lays by the screws 63 (see also Fig. 21).

The front lays 20 together with the horns 61 are clamped to arms 64 being loose on a shaft 65 on which are fixed other arms 66. Between these arms 66 and the arms 64 springs 67 are arranged which press the arms 64 against stops 68 fixed on shaft 65 as long as the front lays are in their advanced position (Fig. 2). When the shaft 65 is returned to the position shown in Fig. 1 the same springs 67 press the adjusting screws 69 to a bar 70 having proper notches in which the forgrippers and parts of the front lays may enter. Thus the different front lays can be adjusted independently from one another. The shaft 65 gets its proper movement when levers 22 are swinging forwards and backwards by a fixed cam 71, roller 72 and an arm 73 fixed to the said shaft, the roller 72 being pressed against the cam by a spring 74 fixed to another arm 75 fixed on the shaft 65.

The embodiment of the forgrippers (Fig. 1, 2, 6 and 7) is essentially the same as usual, but as they are to swing backwards after the transferring of the sheet to the cylinder grippers 76, whilst the back end of the sheet is not yet wholly resting on the surface of the cylinder 5, the length of the grippers 7 is more than usual and the blocks 77 are swung upwards as shown in Fig. 1, when the forgrippers are going backwards.

To allow for this motion of the blocks 77 and for the opening of the grippers 7 the following arrangement is provided for. The blocks 77 are supported by a bar 78 fixed to two arms 79, 79a which again are connected to an axle 80 by a device permitting the height of the blocks 77 to be adjusted. This axle 80 is moved by a rotating cam 81, roller 82 and an arm 83 fixed to the said axle, a spring 84 pressing the roller 82 against the cam 81. The grippers 7 are mounted on a sleeve 85 surrounding the axle 80, this sleeve being controlled by a rotating cam 86, roller 87, an arm 88 loose on the hub of the arm 83 and a properly shaped connecting part 89. Against the pressure of springs 90, 90a the grippers 7 are opened, when they have to take over the sheet in the position shown in Fig. 2 and again, when they transfer the sheet to the cylinder grippers. In all the other times they are closed by the springs 90, 90a, even when the blocks 77 are swung upwards. Thus no special device is necessary to lift the grippers when the forgripper is swinging backwards.

As the back part of the sheet is still resting on the levers 22, when these and the body 49 and consequently the side lays 46 return to their initial position, it is necessary to arrange for a device which lifts the sheet over the side lay 46. This device is shown in Figs. 10, 15 and 16. It consists of a plate 91 with cylindrical surface which is raised by air pressure controlled and operated by a valve mechanism (not shown), entering through the tube 92 under the piston 93 in proper time (Fig. 15). Now the parts 49, 45, 46 can return to their initial position as shown in Fig. 16. When the air pressure is released, a spring 94 presses the piston 93 down again.

If the paper to be fed is very rough it may happen that the sheet resting on that sheet that is to be registered, in consequence of the difference of their respective speeds tends to take along the sheet to be registered or to be taken along by it. To prevent this it will be good to lift the back part of this uppermost sheet. This can be done by an air blast the nozzles of which are connected with the registering device. If this is not sufficient one can arrange one or more suction rollers of well known type rotating with the working speed of the press or the like, which rollers will be disposed in a small distance above the feeding table, or can be moved up and down to seize the uppermost sheet and lift it.

The cylindrical shape of the plate 91 as well as that of the surface 60 and that of several guides 100 (Fig. 1), which are screwed onto bridges 101 clamped to the rod 41 and resting on the rod 40, has the purpose to give the sheet a bending corresponding to the radius of the arch over which the sheet moves in consequence of the swing of the levers 22. Thus the sheet is bent when it touches the side lay 46 which gives it a certain stiffening and prevents it from buckling. For the same reason the parts 45, 46 and 43 are as light as possible.

The exact registering sideways can be adjusted in the following way. As has been told the block 42 is clamped on two rods 40, 41. If the register shall be shifted by a small distance, one loosens the clamping 95 on the rod 40 (Fig. 16), but does not unclamp the clamping device 96 on the rod 41 (Figs. 9 and 10). Now the rod 41 can be adjusted and fixed again by the two nuts 97, 98 turning around a thread 99 of the side rod 41. After this having been done, one clamps again the clamping device 95.

The levers 22 are quickly accelerated to a maximum speed that is higher than the working speed of the press or the like, and keep this speed up to the point of transfer of the sheet to the forgrippers. Then the speed is rapidly diminished so that the levers 22 do not swing far beyond the point of transfer. The return speed is of no importance, it must only be arranged so that the levers 22 are in their back position before the new sheet arrives. The transfer grippers have the same speed as the levers 22 in the point of transfer. They keep this speed for a certain distance and are retarded before the transfer to the cylinder, so that they have the same speed as this cylinder when the sheet is being transferred. After the transfer they are quickly retarded and return to the other transfer point with a certain overswing from which they are accelerated to take over the sheet.

Under certain circumstances it will be good not to push the sheet to be registered against the front lays but to pull them from the front edge. For this purpose the front lays do not return to the point indicated above, but the sheet seized by the first row of nozzles is advanced to touch the front lays which either stand still or advance with a lower speed than the nozzles. This will be effected by a proper shape of the cam 71. The suction effect of the first row of nozzles must be weak enough to allow the sheet to slide on them when it reaches the front lays.

To diminish the shock arising when the head 44 bears against the block 42 a small spring 127 may be disposed on the bar 43 (Fig. 23), which spring is weaker than spring 35 but strong enough to give the effect of a buffer.

If an obliquely cut sheet is to be fed the side lay will be arranged in an oblique position. As the sheet can easily be lifted by the device 91—94 it is possible to use the obtuse angle for the registering which is not possible with the side registering devices used hitherto.

The described device is one example only of the realization of the fundamental idea the newness of which I claim.

To permit the sheet to be registered to rest on the staggered pile of sheets to be fed and covered by the end portion of the preceding sheet, the side lay registering may be effected by a device arranged to act upon the sheet by suction from below so that the sheet may slide when bearing against a fixed stop, instead of being engaged by the tongue-like grippers now in common use. The suction nozzle hereby employed may be disposed as near the front edge of the sheet as the described side lay registering device, provided the sheet is prevented from turning. To this effect a retarding device may be arranged at the opposite edge, which device may also comprise a suction nozzle, or a nozzle of similar design capable of acting upon the upper surface of the rear end of the sheet. The main nozzle disposed at the front end, as well as the second nozzle, which might be applied to the rear end of the sheet, must engage the sheet only in such a way as to allow it to slide along the nozzle or nozzles as soon as its edge strikes a fixed side stop. To facilitate this, the outlet of the nozzle or nozzles may be so designed as to admit external air as soon as the sheet strikes the stop. Instead of suction, static electricity or any other force acting solely on the surface of the sheet may be made use of.

Instead of holding the sheet by suction it may be held by grippers which like the two rows of nozzles may be arranged in front and in back of the side lay. The sheet may be bent in any other shape than that described.

Any other means than that described to draw the sheet against the front lays may be used.

The sliding side lay may be advanced to touch the edge of the sheet whilst the device holding the sheet is not yet shifting. After having touched the edge of the sheet it may be clamped to the device holding the sheet and then advance or return together with the device holding the sheet by a distance equal to the allowance one provides for the sheet coming down to the front lays.

The side lay after having touched the edge of the sheet and being clamped to the device holding the sheet instead of bearing against a fixed stop may interrupt the shifting movement of the device holding the sheet by interrupting the connection of said device holding the sheet with the parts actuating the same, the disconnecting being effected by a clutch, pawl or the like.

The distance by which the device holding the sheet is shifted may be controlled by any feeler device influenced by the edge of the sheet, which feeler device if needed may be completed by the interposition of a mechanical or electrical or pneumatical relay.

The registering device or the forgripper device or both of them may travel by a lower speed than that mentioned in the description.

Any device allowing for the sheet to be registered whilst being partially covered by the preceding sheet or finally any device which allows for the idle part of the printing press or the like being passed in a shorter time than is available for the registering, are also claimed as my invention.

The advantages of the new invention against the devices used hitherto are the following.

1. With the usual side lay registering devices the pressure of the tongue-like effect has to be adjusted depending on the friction of the sheet on the feed board and on the resistance of the edge of the sheet bearing against the side lay. As these with different kinds of paper are not proportional to each other, it may happen that one must give a higher pressure to overcome the friction and consequently the edge will be buckled. In contrary with the described device the friction of the sheet will always be overcome, if the suction in the nozzles 21 and 21a is strong enough. The pressure of the edge against the side lay is in no way dependent on that friction, but only on the friction of the bar 43 in the block 42, and this is adjustable, as has been told.

2. The same applies to the effect of the masses. A very fine sheet of a very big area suddenly must be stopped by the side lay in the same tiny lapse of time as a sheet of the same nature but of a small area would. But the resistance of its edge will not be higher than with that sheet of a small area and consequently small effect of the masses. In the described device it is always the same mass of the parts 43—46 that has to be moved by the edge of the sheet, independent of the size of this sheet. As these parts can be made lighter than the lightest sheet ever fed, a large sheet will buckle no more than a small one.

3. The bending and tightening of the sheet whilst bearing against the side lay is another circumstance avoiding buckling of the sheet.

4. As the danger of buckling forces to lower the speed of the press, the threefold diminishing of this danger means a considerable speeding up.

5. The registering sideways can have no influence on the front register, because the sheets are held fast as soon as the front register is effected. There is no reason therefore to arrange the side lay in a distinct distance from the front edge of the sheet. Consequently it is possible to dispose the side lay as close to the line of the front lays as has been shown in the drawings. This again allows to feed the sheets in a closely overlapped condition very near to the front lays without interfering with the side lay. As the closer the sheets are overlapped, the slower the forward motion will be that brings a new sheet to the front lays in proper time, no slowing down device is necessary with much higher speeds than hitherto has been possible. The strong forces of acceleration which the parts of a slowing down device always are exposed to and which often are the cause of break-downs, thus being avoided the described device allows for much higher speeds of the press.

6. As the registering of a new sheet can take place whilst the back part of the preceding one has not yet passed the registering device, there is a greater part of the revolution available for the registering, and this again means that the machine can turn much faster.

What I claim as my invention is:

1. In a sheet feeding machine in which the sheets are fed in overlapped relation, a device for finally and accurately registering the front edge of the sheets, means for causing said device to grasp a succeeding sheet while the preceding sheet still overlaps, and conveying means for engaging a registered sheet to advance it under positive control and in accurate registered position.

2. In a sheet feeding machine in which the sheets are fed in overlapped relation, a device for finally and accurately registering the front edge of the sheet, means for causing said front registering device to register a succeeding sheet while the preceding sheet still overlaps, and conveying means for engaging a registered sheet to advance it under positive control and in accurate registered position.

3. In a sheet feeding machine in which the sheets are fed in overlapped relation so that each following sheet is partly covered by the preceding sheet, a device for finally and accurately registering the front edge of the sheet, means for causing said front registering device to register a succeeding sheet while the preceding sheet still partly covers the sheet to be registered, and conveying means for engaging a registered sheet to advance it under positive control and in accurate registered position.

4. In a sheet feeding machine in which the sheets are fed in overlapped relation so that each following sheet is partly covered by the preceding sheet, a device for registering the front edge of the sheet, and means for causing said front registering device to register a succeeding sheet while the preceding sheet still partly covers the sheet to be registered, said front registering device comprising front lays supported from underneath the sheet to be registered and projecting a small distance above the sheet so that the covering sheet is slightly lifted.

5. In a sheet feeding machine in which the sheets are fed in overlapped relation so that each following sheet is partly covered by the preceding sheet, a device for registering the front edge of sheet, and means for causing said front registering device to register a succeeding sheet while the preceding sheet still partly covers the sheet to be registered, said front registering device comprising front lays supported from underneath the sheet to be registered and projecting a small distance above the sheet so that the covering sheet is slightly lifted during the registration, said lays being moved forwardly after the registration so that the registered sheet can pass over it.

6. In a sheet feeding machine in which the sheets are fed in overlapped relation so that each following sheet is partly covered by the preceding sheet, a device for registering the front edge of the sheet, and means for causing said front registering device to register a succeeding sheet while the preceding sheet still partly covers the sheet to be registered, said front registering device comprising front lays and horns, or the like, for holding down the sheet to be registered, both of which are supported from underneath the sheet to be registered and project a small distance above said sheet so that the covering sheet is slightly lifted.

7. In a sheet feeding machine in which the sheets are fed in overlapped relation so that each following sheet is partly covered by the preceding sheet, a device for registering the front edge of the sheet, and means for causing said front registering device to register a succeeding sheet while the preceding sheet still partly covers the sheet to be registered, said front registering device comprising front lays and horns, or the like, for holding down the sheet to be registered, both of which are supported from underneath the sheet to be registered and project a small distance above said sheet so that the covering sheet is slightly lifted during the registration, said lays and horns being moved forwardly and downwardly after the registration so that the registered sheet can pass over them.

8. In a sheet feeding machine in which the sheets are fed in overlapped relation so that each following sheet is partly covered by the preceding sheet, a device for registering the front edge of the sheet, an element for registering one side edge of the sheet, means for causing said registering device and element to register a succeeding sheet while the preceding sheet still partly covers the sheet to be registered, and means for advancing a completely registered sheet at a gradually increasing speed.

9. In a sheet feeding machine in which the sheets are fed in overlapped relation so that each following sheet is partly covered by the preceding sheet, a device for registering the front edge of the sheet, an element for registering one side edge of the sheet, and means for causing said registering device and element to register a succeeding sheet while the preceding sheet still covers the sheet to be registered to such an extent that the side registering element is covered during at least a part of the time needed for the lateral registration.

10. In a sheet feeding machine, the combination of a device for holding a sheet when registered in one direction, mechanism for moving said device in another direction, said mechanism being controlled by the position of one edge of a sheet prior to being registered, a member provided with a registering guide and adapted to be readily shifted by a sheet in contact therewith, and means for causing said member to follow the movement of said device at any time during its movement imparted by said mechanism.

11. In a sheet feeding machine, the combination of means for registering one edge of a sheet, a device for holding a sheet when registered, mechanism for moving said device, said mechanism being controlled by the position of another edge of a sheet prior to being registered, a member provided with a registering guide and adapted to be readily shifted by a sheet in contact therewith, and means for causing said member to follow the movement of said device at any time during its movement imparted by said mechanism.

12. In a sheet feeding machine, a device for registering one edge of the sheet, a device for holding the sheet when registered and resilient mechanism for moving said device a predetermined distance, said mechanism being controlled by the position of another edge of the sheet prior to being registered.

13. In a sheet feeding machine, a device for registering one edge of the sheet, a device for holding the sheet when registered and a cam operated resilient mechanism for moving said device a predetermined distance, said mechanism being controlled by the position of another edge of the sheet prior to being registered.

14. In a sheet feeding machine, the combination of a device for registering a sheet in one direction and having means disposed in spaced relation for holding the registered edge of said sheet, mechanism for moving said holding means and registered sheet in another direction, said mechanism being controlled by the position of the edge of a sheet prior to being registered, a member provided with a registering guide and adapted to be readily shifted by a sheet in contact therewith, and means for causing said member to follow the movement of said holding means at any time during its movement imparted by said mechanism.

15. In a sheet feeding machine, the combination of a front lay, a sheet receiving and holding device, means for moving said lay and device toward and away from each other, mechanism for moving said holding device and registered sheet in another direction, said mechanism being controlled by the position of one edge of a sheet prior to being registered, a member provided with a side lay and adapted to be readily shifted by a sheet in contact therewith, and means for causing said member to follow the movement of said device at any time during its movement imparted by said mechanism.

16. In a sheet feeding machine, the combination of a front lay, a sheet receiving and holding device, means for moving said lay and device toward and away from each other, said means being disposed beneath the path of the sheets fed, mechanism for moving said holding device together with a registered sheet in another direction, said mechanism being controlled by the position of one edge of a sheet prior to being registered, a member provided with a side lay and adapted to be readily shifted by a sheet in contact therewith, and means for causing said member to follow the movement of said device at any time during its movement imparted by said mechanism.

17. In a sheet feeding machine, a device for registering the sheet, said device including a suction means for holding the sheet when registered, and mechanism for moving the suction means, said mechanism being controlled by the position of one edge of the sheet prior to being registered.

18. In a sheet feeding machine, a device for registering the sheet, said device including parallel rows of suction nozzles for holding the sheet when registered, and mechanism for moving the suction nozzles, said mechanism being controlled by the position of one edge of the sheet prior to being registered.

19. In a sheet feeding machine, a device for registering and holding the sheet, means for moving said device, and a side lay mounted to slide on the device and controlled by the position of the sheet on the device.

20. In a sheet feeding machine, a device for registering and holding the sheet, means for moving said device, and a side lay frictionally and adjustably mounted to slide on the holding device and controlled by the position of the sheet registered on the device.

21. In a sheet feeding machine, a device for registering and holding the sheet, means for moving said device, a side lay frictionally and adjustably mounted to slide on the device and controlled by the position of the sheet on the device, and an element for securing the side lay to the device.

22. In a sheet feeding machine, a device for registering and holding the sheet, means for moving said device, a side lay frictionally and adjustably mounted to slide on the device and controlled by the position of the sheet on the device, an element for securing the side lay to the device, and a stop for limiting the movement of the side lay.

23. In a sheet feeding machine, a device for registering and holding the sheet, means for moving said device, a side lay frictionally and adjustably mounted to slide on the device and controlled by the position of the sheet on the device, an element for securing the side lay to the device, and a stop for limiting the movement of the side lay, said stop being provided with a yielding means for cushioning the holding device and thereby diminish the impact of the sheet against the stop.

24. In a sheet feeding machine, the combination of a device for registering and holding a sheet, means for moving said device and sheet when registered forwardly, mechanism for moving said device and registered sheet in another direction, said mechanism being controlled by the position of the edge of the sheet prior to being registered, a member provided with a registering guide and adapted to be readily shifted by a sheet in contact therewith, and means for causing said member to follow the movement of said device at any time during its movement imparted by said mechanism.

25. In a sheet feeding machine, a device for registering and holding the sheet, the contacting surface of said device being curved to bend and stiffen the sheet when registered and held thereon, and mechanism for moving the holding device and registered sheet in another direction, said mechanism being controlled by the position of the edge of the sheet prior to being registered.

26. In a sheet feeding machine, a device for registering the sheet including a side lay, means on said device for holding the sheet when registered in front and back of said side lay, and mechanism for moving the holding device and registered sheet laterally, said mechanism being controlled by the position of the edge of the sheet prior to being registered.

27. In a sheet feeding machine, a device for registering the sheet, a member movable into and out of the surface of said device, and means for actuating said member for lifting the previously registered sheet when covering the device away from the device before the arrival of the next sheet to be registered.

28. In a sheet feeding machine, a device for registering the sheet, a spring pressed member having its surface normally disposed in the surface of said device, and means for moving said member outwardly for lifting the sheet away from the device.

29. In a sheet feeding machine, the combination with a rotary cylinder and its grippers, of a device for registering and holding the sheet, and oscillating means for moving the sheet to the grippers on the cylinder at a speed equal to that of the registering device when taking the sheet therefrom and equal to the surface speed of the cylinder when the sheet is delivered to the cylinder, but which exceeds the surface speed of the cylinder between the taking and delivery points, said means being lifted away from the path of the sheet on its rearward movement.

30. In a sheet feeding machine, the combination with a rotary cylinder and its grippers, of a device for registering and holding the sheet, and oscillating means including gripper blocks and spring pressed grippers for moving the sheet to the grippers on the cylinder at a speed equal to that of the registering device when taking the sheet therefrom and equal to the surface speed of the cylinder when the sheet is delivered to the cylinder, but which exceeds the surface speed of the cylinder between the taking and delivery points, said gripper blocks and grippers being lifted out of the path of the sheet on their rearward movement.

31. In a sheet feeding machine, the combination with a rotary cylinder and its grippers, of a device for registering and holding the sheet, and oscillating means including gripper blocks and spring pressed grippers having a common axis, said gripper blocks and grippers being disposed to move the sheet to the grippers on the cylinder at a speed equal to that of the registering device when taking the sheet therefrom and equal to the surface speed of the cylinder when the sheet is delivered to the cylinder, but which exceeds the surface speed of the cylinder between the taking and delivery points and be lifted away from the path of the sheet on their rearward movement.

32. In a sheet feeding machine, the combination with a rotary cylinder and its grippers, of a device for registering and holding the sheet, and means for moving the sheet to the grippers on the cylinder at a speed equal to that of the registering device when taking the sheet therefrom and equal to the surface speed of the cylinder when the sheet is delivered to the cylinder.

33. In a sheet feeding machine, the combination with a rotary cylinder and its grippers, of a device for registering and holding the sheet, and oscillating means for moving the sheet to the grippers on the cylinder at a speed equal to that of the registering device when taking the sheet therefrom and equal to the surface speed of the cylinder when the sheet is delivered to the cylinder, said means being lifted away from the path of the sheet on its rearward movement.

34. In a sheet feeding machine, the combination with a rotary cylinder and its grippers, of a device for registering and holding the sheet, an oscillating means including gripper blocks and spring pressed grippers for moving the sheet to the grippers on the cylinder at a speed equal to that of the registering device when taking the sheet therefrom and equal to the surface speed of the cylinder when the sheet is delivered to the cylinder, said gripper blocks and grippers being lifted out of the path of the sheet on their rearward movement.

35. In a sheet feeding machine, the combination with a rotary cylinder and its grippers, of a device for registering and holding the sheet, and oscillating means including gripper blocks and spring pressed grippers having a common axis, said gripper blocks and grippers being disposed to move the sheet to the grippers on the cylinder at a speed equal to that of the registering device when taking the sheet therefrom and equal to the surface speed of the cylinder when the sheet is delivered to the cylinder, said gripper blocks and grippers also being lifted away from the path of the sheet on their rearward movement.

36. In a sheet feeding machine, the combination of a device for registering and holding a sheet in one direction, mechanism for displacing said holding device after a sheet is registered to offset registration in another direction a distance depending on the position of the edge of a sheet prior to registration so as to accurately bring the edge of the sheet to a predetermined position relative to the machine, a member provided with a registering guide and adapted to be readily shifted by a sheet in contact therewith, and means for causing said member to follow the movement of said device at any time during its movement imparted by said mechanism.

37. In a sheet feeding machine, means for registering one edge of the sheet, a device for holding the sheet when registered, and resilient mechanism for moving said holding device and registered sheet a distance predetermined by the position of the edge of the sheet prior to registration, said mechanism being controlled by the position of another edge of the sheet prior to being registered.

38. In a sheet feeding machine, a device for registering and holding the sheet including a side lay, the contacting surface of said holding device being curved to bend and stiffen the sheet held thereon, means on the device for holding the registered sheet in front and back of said side lay, and mechanism for moving the holding device laterally, said mechanism being controlled by the position of the edge of the sheet prior to being registered.

39. In a sheet feeding machine, the combination with front and side registering devices, of means for progressively feeding the sheets to said registering devices in overlapped relation, said overlapped relation of one sheet with respect to the adjacent sheet during its side registration being at least equal to the distance of the gage of the side registering device from the front registering device.

40. In a sheet feeding machine, a front lay, a sheet receiving and holding device, means for moving said lay and device after the registration of one sheet and before the registration of the next sheet toward and away from each other, and mechanism for moving the holding device and registered sheet in another direction.

41. In a sheet feeding machine, a front lay, a sheet receiving and holding device, means for moving said lay and device after the registration of one sheet and before the registration of the next sheet toward and away from each other, said means being disposed beneath the sheet, and mechanism for moving the holding device and registered sheet in another direction.

42. In a sheet feeding machine, a front lay, a sheet receiving and holding device, and means for moving said lay and device toward and away from each other.

43. In a sheet feeding machine, a front lay, a sheet receiving and holding device, and means for moving said lay and device toward and away from each other, said means being disposed beneath the sheet.

44. In a sheet feeding machine, a front lay, a sheet receiving and holding device, and means for moving said lay and device after the registration of one sheet and before the registration of the next sheet toward and away from each other, said means being disposed beneath the sheet.

45. In a sheet-fed printing-press, the combination of a rotary element of a printing-couple having a non-printing period during each cycle of operation, means on said element to hold a sheet thereon during the printing operation of said couple and to release said sheet upon completion of such printing, and means to feed a sheet to said holding-means for each printing cycle of said couple including means to front and side register the sheets individually in succession before they reach said holding means, said non-printing period of said couple being less than the period used to register a sheet.

46. In a sheet-fed printing-press, the combination of a rotary element of a printing-couple having a non-printing period during each cycle of operation, means on said element to hold a sheet thereon during the printing operation of said couple and to release said sheet upon completion of such printing, and means to feed a sheet to said holding-means for each printing cycle of said couple including means to front and side register the sheets individually in succession, each while partially overlapped by the preceding sheet, and before they reach said holding means, said non-printing period of said couple being less than the period used to register a sheet.

47. In a sheet-feeding mechanism, the combination of front-register gage-means, means to register the sheets individually in succession against said gage-means before the rear edge of the preceding previously-registered sheet has passed said gage-means, side-register gage-means, means to move the front-registered sheets singly one after the other against said side-register gage-means before the preceding sheet has passed by said moving means, and means to convey away while positively maintaining register of the completely registered sheets individually in sequence.

48. The structure presented in claim 47 in which said sheet-moving means engages each sheet on that surface thereof opposite the side next to the preceding sheet.

49. In a sheet-feeding mechanism, the combination of front-register gage-means, means to register the sheets individually in succession against said gage-means while partly overlapped above by the preceding previously-registered sheet, side-register gage-means, means to engage the under surface of, and to move, the front-registered sheets singly one after the other against said side-register gage-means before the preceding sheet has passed by said moving means, and means to convey away while positively maintaining register of the completely registered sheets individually in sequence.

50. In a sheet-feeding mechanism, the combination of front-register gage-means, means to register the sheets individually in succession against said gage-means while partially overlapped above by the preceding previously-registered sheet, side-register gage-means, means to engage the under surface of, and to move, the front-registered sheets individually in succession against said side-register gage-means and while overlapped by the preceding sheet, and means to convey away under positive control the completely registered sheets individually in sequence.

51. In a sheet-fed printing press, the combination of an impression cylinder with a gap in its surface, and means for front and side registering sheets fed in lapped relation within a period of the cycle of said press greater than that represented by said gap, said sheets while being advanced toward said registering means maintaining always the same lapped relation.

52. In a sheet-fed printing-press, the combination of a printing member rotating at a constant speed, mechanism for feeding sheets to said member, a feed table, sheet-registering means associated with said table, said mechanism including means for holding a partially registered sheet, move it to effect final register of the sheet and then advance it under positive control and at a temporary speed in excess of that of said printing member, to thereby accelerate the withdrawal of the sheet from said registering table.

53. In a sheet-feeding machine, the combination of a uniformly-rotating cylinder and its grippers, an oscillatory device for conveying the registered sheets in succession, conveying-means receiving the sheets from said oscillatory device and means for moving said conveying-means at the speed of said device when receiving a sheet therefrom and transferring the sheets to the cylinder-grippers at the surface-speed of the cylinder, the speed of said conveying-means and its sheet exceeding the surface-speed of said cylinder between its sheet-reception and transfer points.

54. In a sheet-fed printing press, the combination of a uniformly rotating printing cylinder, sheet registering means, mechanism for transferring registered sheets individually and under positive control to said cylinder, said mechanism including a plurality of transfer members and means to drive at least one of said members so that it will assume a speed greater than the surface speed of said printing cylinder during its transfer function.

55. In a sheet-fed printing press, the combination of a uniformly rotating printing cylinder, sheet registering means, mechanism for transferring registered sheets individually and under positive control to said cylinder, said mechanism including a plurality of independently actuated transfer members and means to drive at least one of said members so that it will assume a speed greater than the surface speed of said printing cylinder during its transfer function.

56. In a sheet-fed printing-press, the combination of a uniformly rotating printing member having sheet engaging elements, an oscillatory device for engaging a sheet and accelerating it to a speed greater than the surface speed of said printing member, a second oscillatory device, and means to drive the latter at a variable speed, said second oscillatory device being arranged to receive a sheet from said first device at a speed greater than the surface speed of said printing member and transfer it to said sheet engaging elements at printing speed.

57. In a sheet-fed printing press, the combination of a uniformly rotating printing member having sheet engaging elements, an oscillatory device having sheet registering means travelling therewith and adapted to engage a sheet and accelerate it to a speed greater than the surface speed of said printing member, a second oscillatory device, and means to drive the latter at a variable speed, said second oscillatory device being arranged to receive a sheet from said first device at a speed greater than the surface speed of said printing member and transfer it to said sheet engaging elements at printing speed.

58. In a sheet-feeding machine in which the sheets are fed in overlapped relation, the combination of means to finally and accurately register the front edges of the sheets individually in succession, each while overlapped by the preceding sheet, means to finally and accurately register a side edge of said sheets individually in succession, and conveying means to engage each completely-registered sheet and to advance it under positive control while maintaining its accurate registration.

59. In a sheet-feeding machine in which the sheets are fed in overlapped relation, the combination of means to finally and accurately register the front edges of the sheets individually in succession, each while overlapped by the preceding sheet, means to finally and accurately register a side edge of said sheets individually in succession, said side-registration of each sheet being initiated while overlapped by the preceding sheet, and conveying means to engage each completely-registered sheet and to advance it under positive control while maintaining its accurate registration.

60. In a sheet-feeding and registering device, the combination of means to feed a series of sheets in partially overlapped relation in the direction of feed, means to front register the sheets in succession each while partially overlapped by the preceding sheet, means to positively hold each such registered sheet in position, and conveying means to engage each registered sheet in turn and to advance it under positive control and in accurate registered position, said holding means transferring each registered sheet to said conveying means.

61. In a sheet feeding and registering device, the combination of means to feed a series of sheets in partially overlapped relation in the direction of feed, means to front register the sheets in succession each while partially overlapped by the preceding sheet, means to positively hold each such registered sheet in position, and conveying means to engage each registered sheet in turn and to advance it under positive control and in accurate registered position, said holding means transferring each registered sheet to said conveying means and said conveying means operating at a variable speed.

62. In a sheet-feeding and registering device, the combination of means to feed a series of sheets in partially overlapped relation in the direction of feed, means to finally and accurately register the front edges of the sheets individually in succession, each while overlapped by the preceding sheet, means to finally and accurately register a side edge of said sheets individually in succession, and conveying means to engage each completely-registered sheet and to advance it under positive control while maintaining its accurate registration, said conveying means feeding said sheets in unlapped relation.

63. In a sheet fed rotary printing press, the combination of an impression cylinder having a gap in its cylindrical surface and rotating continuously with not to exceed one revolution for each printing operation, means to temporarily hold a sheet on said cylinder, means to front and side register the sheets individually, each sheet during a period of time greater than that occupied by said cylinder gap in passing a given point, and means to advance the registered sheets in succession toward and to deliver the sheets individually to said cylinder and its sheet holding means, one for each revolution of the cylinder.

64. In a sheet fed rotary printing press, the combination of an impression cylinder having a gap in its cylindrical surface and rotating continously with not to exceed one revolution for each printing operation, means to temporarily hold a sheet on said cylinder, means to automatically front and side register the sheets individually, each sheet during a period of time greater than that occupied by said cylinder gap in passing a given point, and means to advance the registered sheets in succession toward and to deliver the sheets individually to said cylinder and its sheet holding means, one for each revolution of the cylinder.

65. In a sheet fed printing press, the combination of a rotary element of a printing-couple having a non-printing period during each cycle of operation, means on said element to hold a sheet thereon, means to feed a sheet to said holding-means for each printing cycle of said couple, and means to front and side register the sheets individually in succession before they reach said holding-means, said non-printing period of said couple being less than the period used to register a sheet.

66. In a sheet fed printing press, the combination of a rotary element of a printing-couple having a non-printing period during each cycle of operation, means on said element to hold a sheet thereon, means to feed a sheet to said holding means for each printing cycle of said couple, and means to front and side register the sheets individually in succession, each while partially overlapped by the preceding sheet, said non-printing period of said couple being less than the period used to register a sheet.

67. In a sheet feeding machine, the combination of means for feeding sheets in lapped relation toward the impression cylinder of a printing press, means for registering the front edges of the sheets successively each while lapped by the preceding sheet, means for side registering the sheets successively, and opening and closing transfer grippers for engaging the front and side registered sheets along the front edge thereof and for maintaining them under positive control in accurate register and transferring said sheets in succession to said impression cylinder.

68. In a sheet feeding machine, the combination of means for feeding sheets in lapped relation toward the impression cylinder of a printing press, means for registering the front edges of the sheets, means for side registering the sheets successively each while lapped by the preceding sheet, and opening and closing transfer grippers for engaging the front and side registered sheets each along the front edge thereof and for maintaining them under positive control in accurate register and transferring said sheets in succession to said impression cylinder.

69. In a sheet feeding machine in which the sheets are fed in overlapped relation, mechanism for finally and accurately registering the front edge of the sheets, said mechanism comprising means for finally and accurately registering the side edge of the sheets and for grasping a registered sheet while still overlapped by the precedin sheet and advancing it under positive control and in accurate registered position.

70. In a sheet fed printing press, the combination of an impression cylinder having a gap in its surface, means for supporting a supply of sheets to be fed to said cylinder, a feed table, sheet registering means, means to separate sheets from said supply, means to remove the separated sheets individually and in succession with all of the sheets as they are being removed from said supply traveling in the same direction and over said feed table to advance them to said registering means, and means to front and side register said sheets within a period of the cycle of said press greater than that period occupied by said cylinder gap in passing a given point.

ARTHUR WORMSER.